US007804773B2

(12) United States Patent
Raftelis

(10) Patent No.: US 7,804,773 B2
(45) Date of Patent: Sep. 28, 2010

(54) SYSTEM AND METHOD OF MANAGING DATA FLOW IN A NETWORK

(75) Inventor: Michael Raftelis, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1108 days.

(21) Appl. No.: 11/258,396

(22) Filed: Oct. 25, 2005

(65) Prior Publication Data
US 2007/0091808 A1   Apr. 26, 2007

(51) Int. Cl.
*G01R 31/08* (2006.01)
(52) U.S. Cl. .................................................. 370/230
(58) Field of Classification Search .......... 370/229–240
See application file for complete search history.

(56) References Cited
U.S. PATENT DOCUMENTS

2004/0202110 A1*  10/2004  Kim ........................... 370/235
2004/0215976 A1*  10/2004  Jain ........................... 713/201
2006/0021040 A1*   1/2006  Boulanger et al. ............ 726/23
2006/0146816 A1*   7/2006  Jain ........................... 370/389
2008/0043620 A1*   2/2008  Ye .............................. 370/232
2008/0101239 A1*   5/2008  Goode ........................ 370/235

* cited by examiner

*Primary Examiner*—Kwang B Yao
*Assistant Examiner*—Tung Q Tran
(74) *Attorney, Agent, or Firm*—Toler Law Group

(57) ABSTRACT

The present disclosure is directed to a system and method to manage data flow in a network. The method includes receiving a plurality of data flows, wherein each of the plurality of data flows includes a plurality of data packets. The method also includes determining a protocol associated with each of the plurality of data flows. The method also includes dropping at least one data packet from at least one data flow associated with a first protocol, wherein the at least one dropped data packet meets a first criterion associated with the first protocol. The method also includes dropping at least one additional data packet from a data flow associated with a second protocol, wherein the at least one additional data packet meets a second criterion associated with the second protocol.

26 Claims, 7 Drawing Sheets

SYSTEM AND METHOD OF MANAGING DATA FLOW IN A NETWORK

FIELD OF THE DISCLOSURE

The present disclosure relates generally to managing data flow in a network.

BACKGROUND OF THE DISCLOSURE

Network communication has become indispensable to the efficient transmission of data. As the Internet has gained prevalence in homes and businesses, various protocols have arisen to merge telephone, video and other data types onto full service networks. These networks can use aggregate devices, such as routers, to separate data traffic of various types into different queues. Thus, data from many source devices, such as Voice over Internet Protocol (VoIP) phones, Internet Protocol television (IPTV) devices, and Internet websites, all reach their intended destinations while traveling over the same network.

The volume of data traffic on full service networks can lead to congestion and cause network performance to deteriorate. As queues get filled up, packets are dropped in a process referred to as "tail drop." Tail drop can be inefficient because all the packets in the queue are treated with equal preference. Thus, data flows that require large amounts of bandwidth can often be maintained at the expense of more numerous smaller data flows. While this process may relieve some network congestion, it often decreases network performance for the majority of users on the network.

Some methods, such as random early detect (RED), statistically drop packets from flows before a network reaches a hard limit. This approach assumes that the majority of data flows are based on transmission control protocol (TCP), which adjusts its throughput based on dropped packets. Newer applications, such as IPTV, are based on user datagram protocol (UDP) and require the application layer to request retransmission. This produces higher processor and memory utilization at the network and still may result in poor performance. Additionally, the process penalizes short-lived small data flows, while constant flows that are more bandwidth intensive receive more favorable treatment.

DETAILED DESCRIPTION OF THE DRAWINGS

A system to manage data flow in a network is disclosed and includes a processor and a memory accessible to the processor. A computer program is embedded in the memory and includes instructions to receive a plurality of data flows, where each of the plurality of data flows includes a plurality of data packets. The computer program further includes instructions to selectively apply a packet treatment label to each of the plurality of data packets and to selectively drop at least one of the plurality of data packets, at least partially based on the packet treatment label associated with each of the plurality of data packets.

In another embodiment, a method of managing data flow in a network is disclosed. The method includes receiving a plurality of data flows, where each of the plurality of data flows includes a plurality of data packets. The method also includes determining a protocol associated with each of the plurality of data flows. The method further includes dropping at least one data packet from at least one of the data flows that is associated with a first protocol, where the at least one dropped data packet meets a first criterion associated with the first protocol. Additionally, the method includes dropping at least one additional data packet from a data flow associated with a second protocol, wherein the at least one additional data packet meets a second criterion corresponding to the second protocol.

In another embodiment, a computer program embedded in a computer-readable medium is disclosed and includes instructions to process a plurality of data flows within a queue, wherein each of the plurality of data flows includes a plurality of data packets. The computer program also includes instructions to drop at least one data packet from at least one of the plurality of data flows when the queue is congested. The computer program further includes instructions to increment a counter associated with the at least one of the plurality of data flows from which the at least one packet is dropped. Additionally, the computer program includes instructions to associate a counter with each of the plurality of data flows, where data packets are selectively dropped from the plurality of data flows at least partially based on a value of the counter assigned to each of the plurality of data flows.

Figure 1:
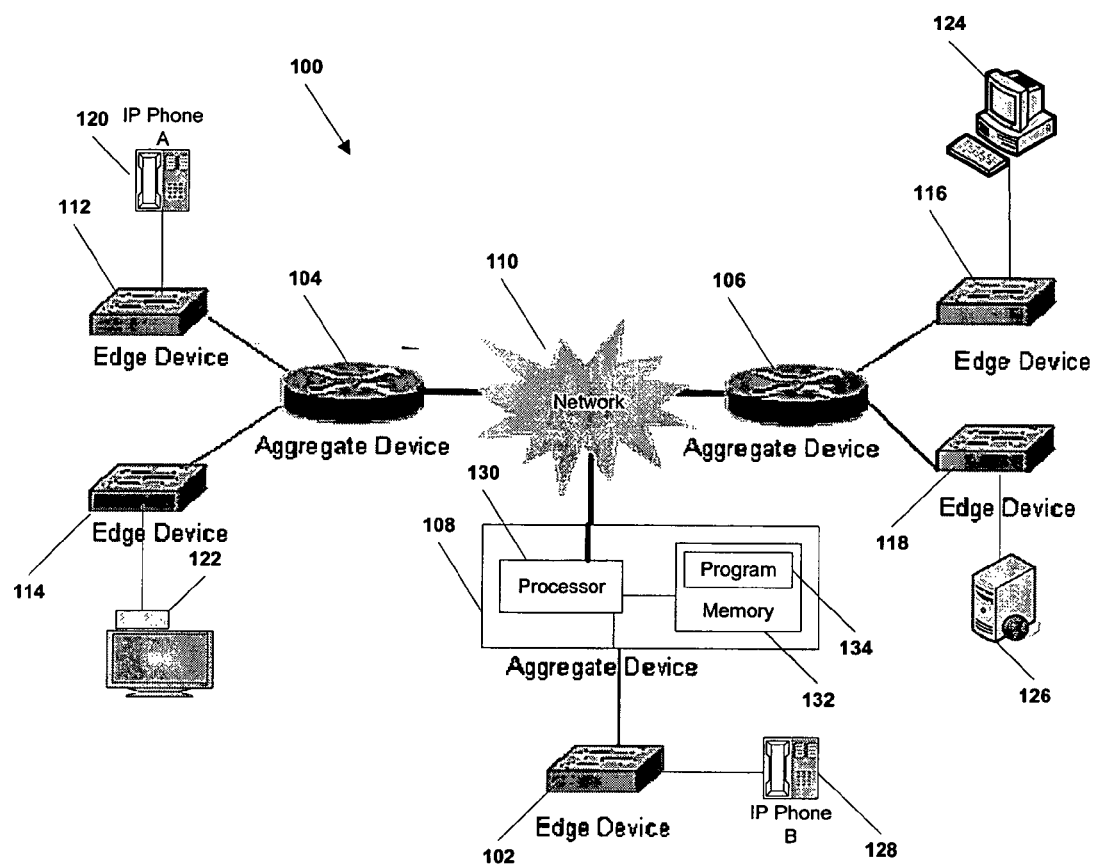
FIG. 1 is a block diagram illustrating an embodiment of a system to manage data flow in a network.

Referring to FIG. 1, a system to manage data flow in a network is shown and is generally designated 100. As shown, the system 100 includes a first aggregate device 104, a second aggregate device 106, and a third aggregate device 108, which are coupled to each other via a network 110. A first edge device 112 and a second edge device 114 are coupled to the first aggregate device 104. A third edge device 116 and a fourth edge device 118 are coupled to the second aggregate device 106. Moreover, a fifth edge device 102 is coupled to the third aggregate device 108.

In a particular embodiment, each edge device can communicate with a terminal device. Examples of such terminal devices are shown in FIG. 1. For instance, the first edge device 112 can communicate with an internet protocol (IP) Phone A 120; the second edge device 114 can communicate with a set-top box device 122; the third edge device 116 can communicate with a user computer 124; the fourth edge device 118 can communicate with a web server 126; and the fifth edge device 102 can communicate with an IP phone B 128. Each edge device can receive data from a terminal device to which it is coupled and transmit data to the aggregate device to which it is coupled. The data can be transmitted over the network 110 to other aggregate devices that communicate with an edge device coupled to the intended destination of the data.

In an illustrative embodiment, if IP phone A 120 can issue a call to IP phone B 128, data is communicated from IP phone A to the first edge device 112. The first edge device 112 communicates the data to the first aggregate device 104, which transmits the data across the network 110 to the third aggregate device 108. The third aggregate device 108 transmits the data to the fifth edge device 102, which transmits the data to IP phone B 128.

Though certain devices are referred to as source or destination devices for purposes of example, any terminal device, such as devices 120-128 can be a source or destination device.

In a particular embodiment, as shown in FIG. 1, the third aggregate device 108 can include a processor 130 and a memory device 132 that is accessible to the processor 130. In an illustrative embodiment, the third aggregate device 108 can be a network router. The third aggregate device 108 can include a computer program 134 embedded within the memory device 132. In a particular embodiment, each other aggregate device 104, 106 can have the same or a similar internal structure as the third aggregated device 108. Though the computer program 134 is described with reference to functions of the third aggregate device 108, each computer program can include instructions relating to functions of the aggregate device in which it is embedded.

In one embodiment, the computer program 134 can include instructions to process a plurality of data flows. In this embodiment, each of the plurality of data flows can include a plurality of data packets. The computer program 134 can also include instructions to determine whether a data flow queue is congested. In an illustrative embodiment, the computer program 134 can determine that the queue is congested when an incoming data stream exceeds a certain proportion of a capacity of the queue.

In a particular embodiment, when the queue is congested, the computer program 134 can include instructions to identify a protocol of each data flow. Additionally, the computer program 134 can contain instructions to drop at least one data packet from a data flow that matches a pre-defined protocol, when the dropped data packet(s) meet a criterion that corresponds to the protocol. For example, the computer program 134 can contain instructions to determine whether any of the data flows are transmitted using a transmission control protocol (TCP). In this example, the computer program 134 can contain instructions to drop selected data packets based on their TCP window size. In an illustrative embodiment, data packets that meet or exceed a certain TCP window size can be dropped. In another illustrative embodiment, data packets that are less than a certain TCP window size can be dropped.

The computer program 134 can contain instructions to assign a counter to each of the plurality of data flows in a queue and to zero those counters when the queue becomes congested. Moreover, the computer program 134 can contain instructions to associate each counter with a data flow and to store the data flows, counters and counter positions. The computer program 134 can contain instructions to drop data packets from a data flow whose counter is lower than or equal to the counter of each other data flow in the queue. Further, the computer program 134 can contain instructions to increment the counter of each data flow from which at least one data packet is dropped. For example, the computer program 134 can include instructions to compare counters of data packets that meet or exceed a certain TCP window size and to drop the packet(s) with the lowest counter(s).

In another embodiment, the computer program 134 can contain instructions to selectively apply a packet treatment label to each of the data packets that are received at a queue. In this embodiment, the computer program 134 can contain instructions to selectively drop one or more data packets, based on the packet treatment label of the data packet(s). For example, each packet treatment label (PTL) can identify a class of data traffic, a data transmission protocol, a priority of data transmission, or other labels suitable for determining a hierarchy or criteria for dropping data packets.

Figure 2:
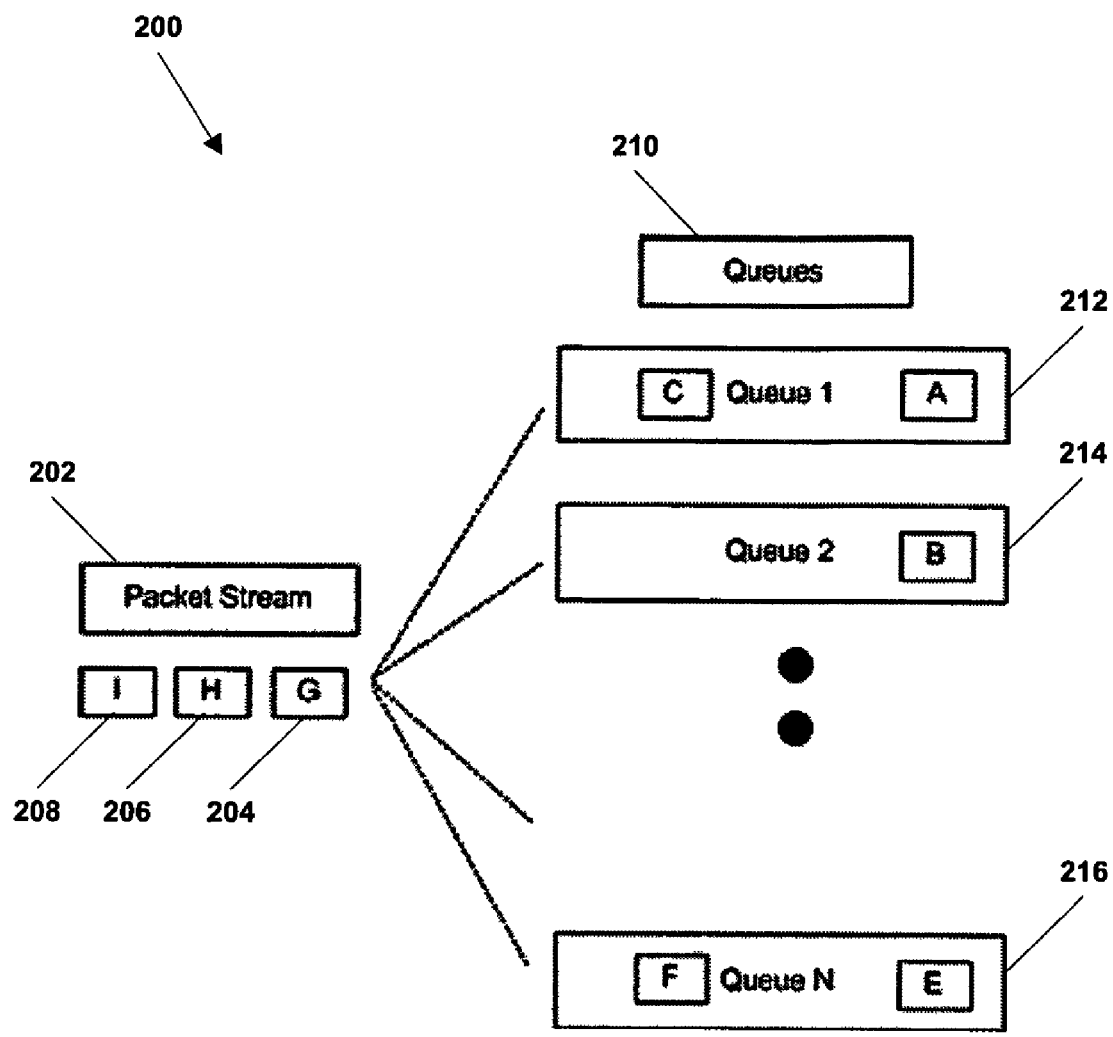
FIG. 2 is a block diagram illustrating an embodiment of a queueing system.

Referring to FIG. 2, a queuing system is shown at 200. As shown, the system 200 includes a data packet stream 202. The data packet stream 202 includes a plurality of data flows that can include, for example, a first data packet 204, a second data packet 206, and a third data packet 208. The data packets 204, 206, 208 in the data packet stream 202 are routed to a plurality of queues 210, such as a first queue 212, a second queue 214, and an Nth queue 216. In a particular embodiment, the data packets 204, 206, 208 are routed, based on pre-defined processing rules.

In an illustrative embodiment, each queue 212, 214, 216 can receive data packets of a certain priority, protocol, data type, class of data traffic, or the like. For example, the first queue 212 could receive packets sent using a TCP protocol; the second queue 214 could receive packets sent using a user datagram protocol (UDP); and the Nth queue could contain data packets sent using a file transfer protocol (FTP). In another example, the first queue 1 212 could receive IPTV data; the second queue 214 could receive video conferencing data; and the Nth queue 216 could receive IP telephony data. In another example, the Nth queue 218 could receive data packets that are lowest in priority, and the first queue 212 could receive data packets that are highest in priority.

In another embodiment, data packets can be routed to queues based on the level of congestion in each queue. For example, data packets can be routed to the least congested queue, regardless of the type of data transmitted in the data packets.

Figure 3:
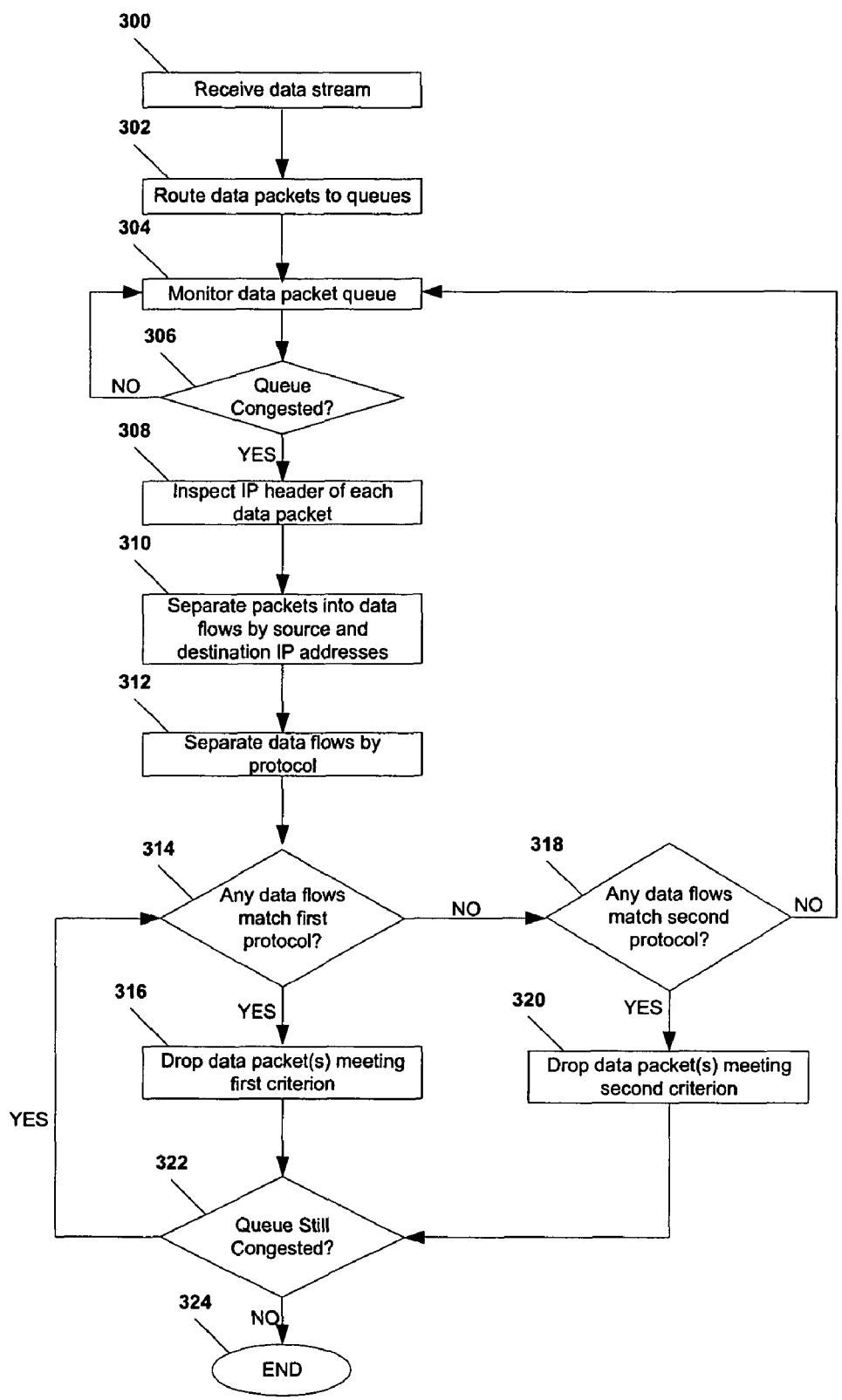
FIG. 3 is a flow diagram illustrating an embodiment of a method of managing data flow in a network.

Referring to FIG. 3, a method of managing data flow in a network is shown. At block 300, a data stream is received at a network aggregate device, such as a router. In an illustrative embodiment, the data stream includes a plurality of data flows, and each data flow includes a plurality of data packets. At block 302, the data packets are routed to one or more queues within the aggregate device. In an illustrative embodiment, each queue can contain data packets of a certain priority, protocol, data type, class of data traffic, or the like. In another illustrative embodiment, data packets can be routed to queues based on the level of congestion in each queue. For example, data packets can be routed to the least congested queue, regardless of the type of data transmitted in the data packets.

Moving to block 304, each queue is monitored for congestion. At decision step 306, it is determined whether a queue is congested. For example, the queue can be deemed congested when the data packets within the queue exceeds a certain proportion of a capacity of the queue. For example, if the data packets within a queue exceed eighty percent (80%) or ninety percent (90%) of the queue's capacity, the queue can be deemed congested. If the queue is not congested, the method returns to block 304, and the monitoring continues. Conversely, if the queue is congested, the method proceeds to block 308, and the IP header of each data packet can be inspected to determine its source and destination IP addresses. In a particular embodiment, at block 310, the data packets can be separated into data flows according to their source-destination combinations.

Moving to block 312, the data flows can also be separated by protocol type. At decision step 314, it is determined whether any data flows match a first protocol. For example, the first protocol can be a lowest priority protocol, such that packets of the first protocol are the first candidates to be dropped. If any of the data flows match the first protocol, the method proceeds to block 316, and one or more data packets that match a first criterion that corresponds to the first protocol are dropped. For example, if the first protocol is TCP, then the first criterion can be a comparison of data packets to TCP window size. In another example, if the first protocol is file transfer protocol (FTP), the first criterion can be a file size. In an additional example, if the first protocol is user datagram protocol (UDP) the first criterion can be a datagram size. In still another example, if the first protocol is hypertext transfer protocol (HTTP) the first criterion can be a file type, such as a text file, a graphics file, an image file, a sound file, a video file, or a multimedia file.

Returning to decision step 314, if no data flows match the first protocol, the method proceeds to decision step 318, and it is determined whether any data flows match a second protocol. For example, the second protocol can be a second lowest priority protocol, such that packets of the second lowest priority protocol are the next candidates to be dropped if no data flows match the first protocol. In a particular embodiment, this determination can be repeated for a plurality of protocols that are arranged by priority, e.g., a third protocol, a fourth protocol, and an Nth protocol. For instance, FTP packets can be prioritized lower than IPTV data packets, and IPTV packets can be prioritized lower than video conferencing packets.

After a data flow matching the second protocol has been found, the method moves to block 320, and data packets that meet a second criterion that corresponds to the second protocol are dropped. For example, if the second protocol is FTP, the second criterion can be the type or size of files being transmitted by the FTP data packets. In an additional example, if the second protocol is user datagram protocol (UDP) the second criterion can be a datagram size. In still another example, if the second protocol is hypertext transfer protocol (HTTP) the second criterion can be a file type, such as a text file, a graphics file, an image file, a sound file, a video file, or a multimedia file.

After data packets have been dropped, whether according to the first protocol criterion at block 316 or the second protocol criterion at block 320, the method can proceed to decision step 322. At decision step 322, it can be determined whether the queue is still congested. In this embodiment, if the queue is still congested, the method returns to decision step 314 and continues as described. If the queue is not still congested, the method terminates at state 324.

Figure 4:
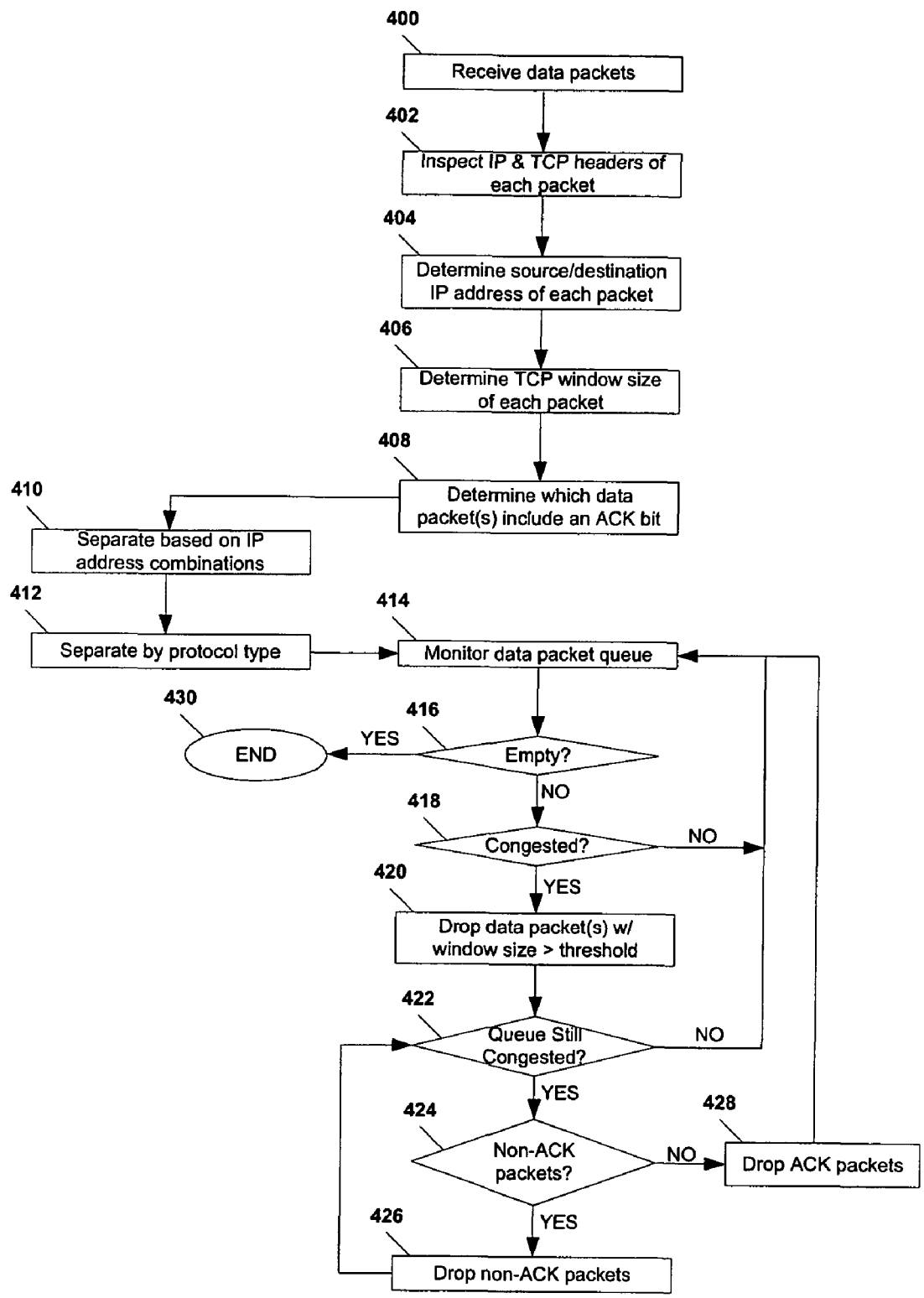
FIG. 4 is a flow diagram illustrating a second embodiment of a method of managing data flow in a network.

Referring to FIG. 4, a second embodiment of a method of managing data flow in a network is shown. At block 400, a plurality of data packets is received at a network aggregate device, such as a router. At block 402, the IP and TCP headers of each data packet are inspected. Moving to block 404, the source and destination IP addresses of each data packet are determined. Further, at block 406, the TCP window size of each data packet is determined. Additionally, at block 408, it is determined which data packet(s) include an acknowledgement (ACK) bit.

Continuing to block 410, the data packets can be separated according to their source-destination address combinations. The data packets can also be separated by protocol type at block 412. In a particular embodiment, data packets can alternatively be routed to separate queues based on their protocol types.

Moving to block 414, each data packet queue is monitored for congestion. At decision step 416, it is determined whether a data packet queue is empty. If the data packet queue is empty, the method ends at state 430. On the other hand, if the data packet queue is not empty, the method proceeds to decision step 418, and it is determined whether the data packet queue is congested. For example, the queue can be deemed congested when the data packets within the queue exceeds a certain proportion of a capacity of the queue.

If the queue is not congested, the method returns to block 414, and the monitoring continues. Conversely, if the queue is congested, the method moves to block 420, and data packets having a TCP window size that exceeds a threshold window size can be dropped. Continuing to decision step 422, it is determined whether the queue is still congested. If the queue is not congested, the method returns to block 414, and the monitoring continues.

Alternatively, at decision step 422, if the queue is still congested, the method can proceed to decision step 424, and it can be determined whether there are any non-ACK packets, i.e., packets that do not include ACK bits, within the queue. If there are non-ACK packets within the queue, the method moves to block 426, and the non-ACK packets can be dropped. The method then returns to decision step 422 and continues as described.

On the other hand, if there are not any non-ACK packets within the queue, the method moves to block 428, and ACK packets, i.e., packets with ACK bits, can be dropped. In one embodiment, ACK packets can be dropped randomly. In another embodiment, ACK packets can be dropped according to queue position, i.e., the ACK packet at the highest or lowest position in the queue can be dropped first. The method then returns to block 414 and continues as described.

Figure 5:
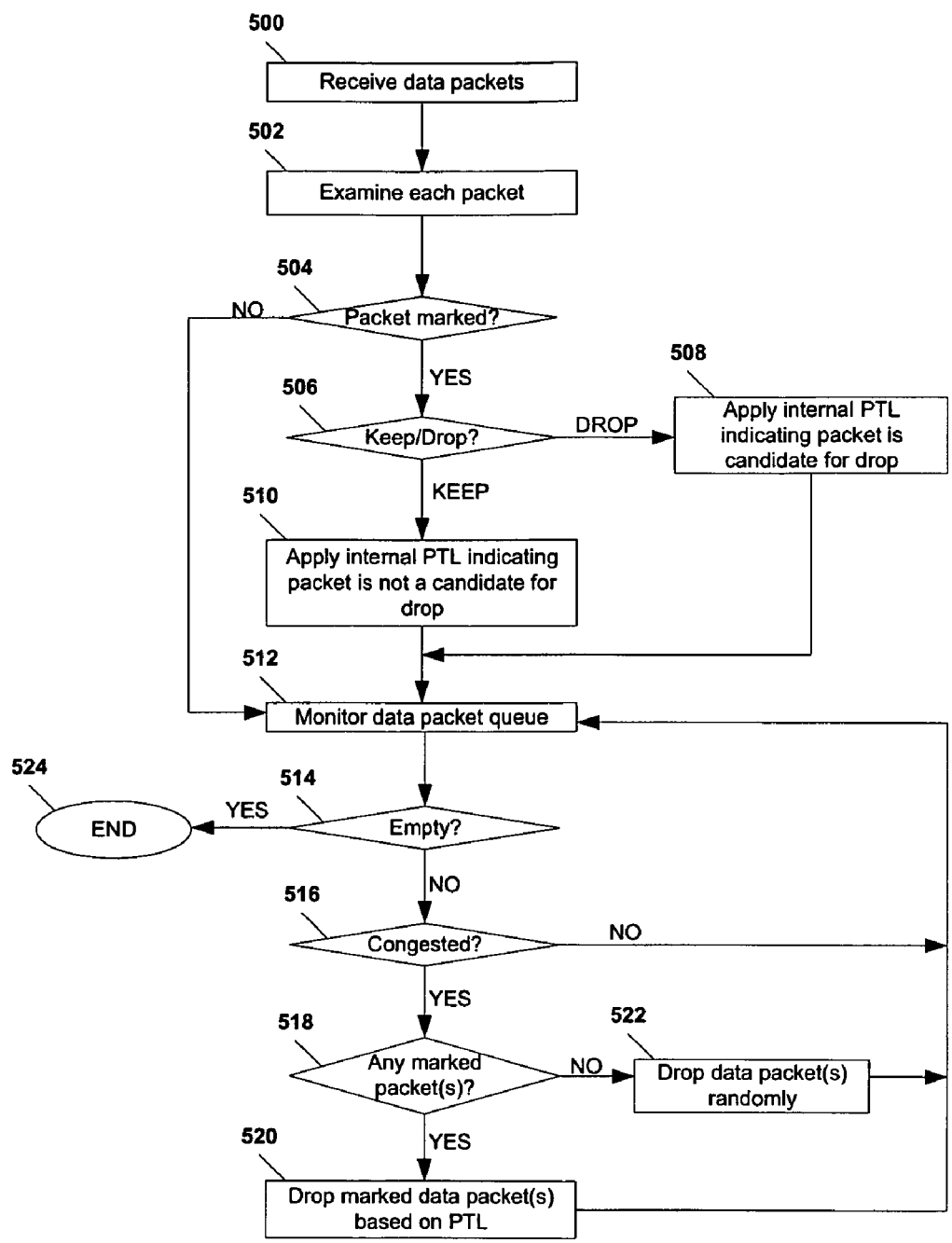
FIG. 5 is a flow diagram illustrating a third embodiment of a method of managing data flow in a network.

Referring to FIG. 5, a third embodiment of a method of managing data flow in a network is shown. At block 500, a plurality of data packets is received at a network aggregate device, such as a router. At block 502, the packets are examined for internal markers or labels. Moving to decision step 504, it is determined whether each packet contains an internal marker. If a packet is marked, the method continues to decision step 506, and it is determined whether the packet is a candidate to be dropped or whether the packet should be kept, when queue congestion occurs.

As shown in FIG. 5, if it is determined that a data packet is a candidate to be dropped when queue congestion occurs, the method continues to block 508, and a packet treatment label (PTL) is applied, which indicates that the packet is a drop candidate. The method then moves to block 512. Conversely, if it is determined that a data packet is to be kept when queue congestion occurs, the method proceeds to block 510, and a packet treatment label (PTL) indicating that the packet is not a drop candidate is applied. The method then continues to block 512. Returning to decision step 504, if a packet is not marked, the method proceeds directly to block 512.

At block 512, each data packet queue is monitored. At decision step 514, it is determined whether a data packet queue is empty. If the data packet queue is empty, the method ends at state 524. On the other hand, if the data packet queue is not empty, the method proceeds to decision step 516, and it is determined whether the data packet queue is congested. For example, the queue can be deemed congested when the data packets within the queue exceeds a certain proportion of a capacity of the queue.

If the queue is not congested, the method returns to block 512, and the monitoring of the queue continues. Conversely, if the queue is congested, the method moves to decision step 518, and it is determined whether any marked packets are within the queue. In a particular embodiment, if marked packets are present in the queue, the method moves to block 520, and these marked packets are dropped according to their PTL labels. For example, one or more data packets with PTL numbers indicating priorities lower than the PTL numbers of any remaining data packets can be dropped. Alternatively, if no marked packets remain in the queue, the unmarked packets can be dropped according to another suitable method for dropping data packets. In an illustrative embodiment, the unmarked packets can be dropped randomly, as shown at block 522. After marked or unmarked packets are dropped from the queue, the method then returns to block 512, and the queue is monitored for congestion.

In an illustrative embodiment, a PTL number can be assigned to each data packet, depending on its data traffic type. For example, the PTL number can indicate priority in an ascending order, wherein a PTL number of zero or one indicates that a data packet contains the lowest priority data traffic type. In another example, the PTL number can indicate priority in a descending order, wherein a PTL number of zero or one indicates that a data packet contains the highest priority data traffic type. The PTL is strictly used for monitoring within the queue and does not alter the packet header or its contents.

Figure 6:
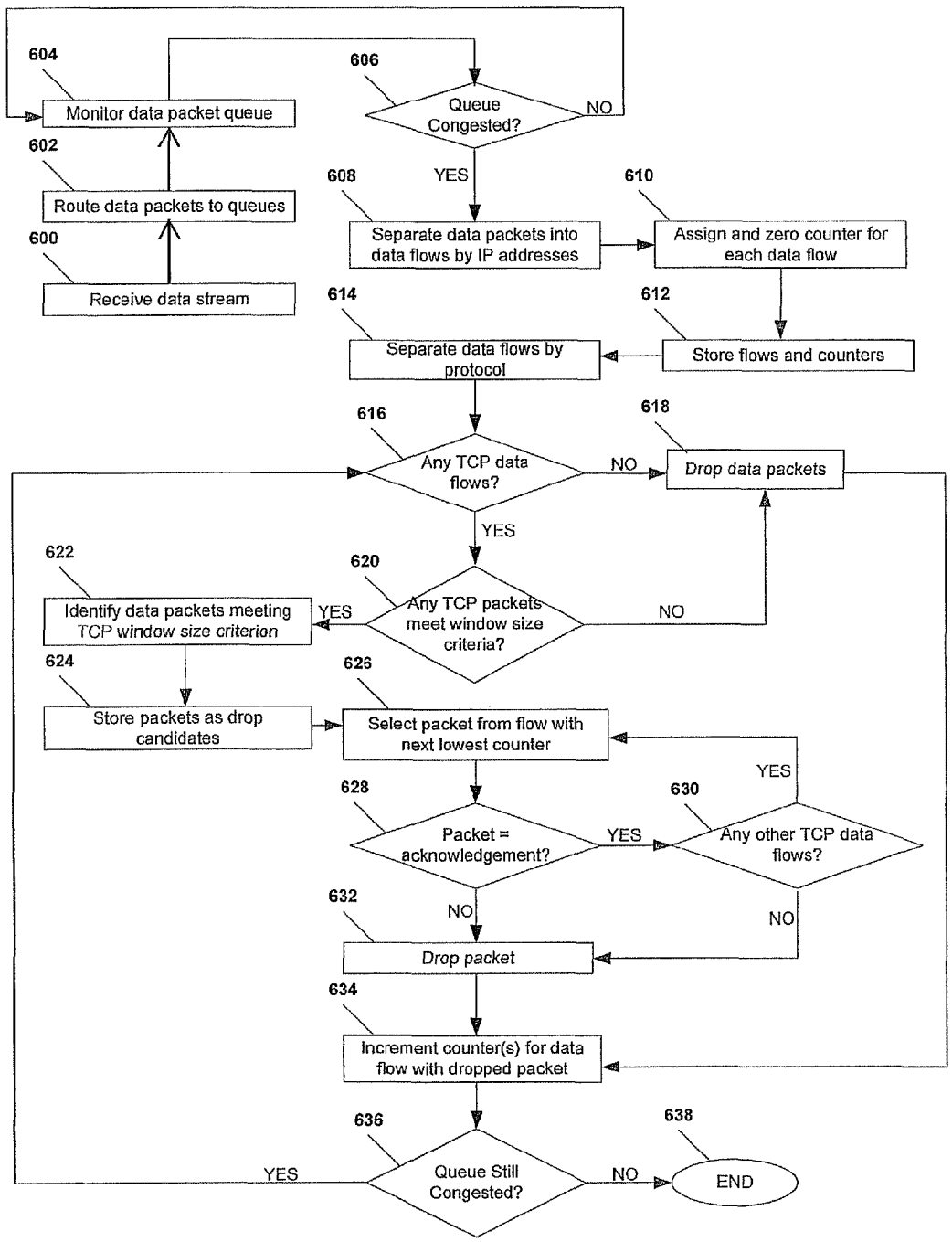
FIG. 6 is a flow diagram illustrating a fourth embodiment of a method of managing data flow in a network.

Referring to FIG. 6, a fourth embodiment of a method of managing data flow in a network is shown. At block 600, a data stream that includes a plurality of data packets is received at a network aggregate device, such as a router. At block 602, the data packets are routed to one or more queues at the aggregate device. Moving to block 604, each queue is monitored. At decision step 606, it is determined whether a queue is congested. For example, the queue can be deemed congested when the data packets within the queue exceeds a certain proportion of a capacity of the queue. If the queue is not congested, the method returns to block 604, and monitoring continues.

In an illustrative embodiment, if the queue is congested, the method proceeds to block 608, and the data packets can be separated into data flows according to their source-destination address combinations. For example, the IP header of each data packet can be inspected to determine its source and destination IP addresses. At block 610, each data flow can be assigned a counter that is initially set to zero. Each counter measures how many data packets have been dropped from the data flow or how many times any number of data packets have been dropped from the data flow. Further, at block 612, the data flows and associated counters are stored.

Moving to block 614, the data flows can be separated by protocol type. Next, at decision step 616, it is determined whether any data flows are TCP based. If no data flows are TCP based, the method proceeds to block 618, and the data packets can be dropped, e.g., randomly. Proceeding to block 634, the counter for any data flow from which a packet has been dropped is incremented. At decision step 636, it is determined whether the queue is still congested. If the queue is still congested, the method returns to decision step 616. If the queue is not still congested, the method terminates at 638.

Returning to decision step 616, if one or more data flows are TCP based, the method proceeds to decision step 620, and it is determined whether any data packets within the TCP data flow(s) meet a TCP window size criterion. In an illustrative embodiment, data packets that are greater than, or equal to, a certain TCP window size can be dropped. In another illustrative embodiment, data packets that are less than a certain TCP window size can be dropped.

In a particular embodiment, the data packet(s) meeting the TCP window size criterion can be identified at block 622 and stored as one or more drop candidates at block 624. In this embodiment, a drop candidate, from a data flow whose counter is less than or equal to the counter of each other data flow, can be selected at block 626. Further, in an illustrative embodiment, it can be determined at decision step 628 whether the selected packet is a packet with an acknowledgement (ACK) bit. If the selected packet is not a packet with an ACK bit, the method proceeds to block 632, and the packet is dropped. Conversely, if the selected packet is a packet with an ACK bit, the method moves to decision step 630.

At decision step 630, it is determined whether any other TCP data flows remain. If no other TCP data flows remain, the packet with the ACK bit is dropped at block 632. On the other hand, if other TCP data flows remain, the method returns to block 626, and a packet from a data flow with a next lowest counter can be selected.

Proceeding to block 634, the counter for any data flow from which a packet has been dropped is incremented. At decision step 636, it is determined whether the queue is still congested. If the queue is still congested, the method returns to decision step 616. If the queue is not still congested, the method terminates at 638.

In a particular embodiment, the steps of the methods described herein are executed in the order shown by the figures. In alternative embodiments, the steps may be executed in alternative sequences without departing from the scope of the disclosure.

Figure 7:
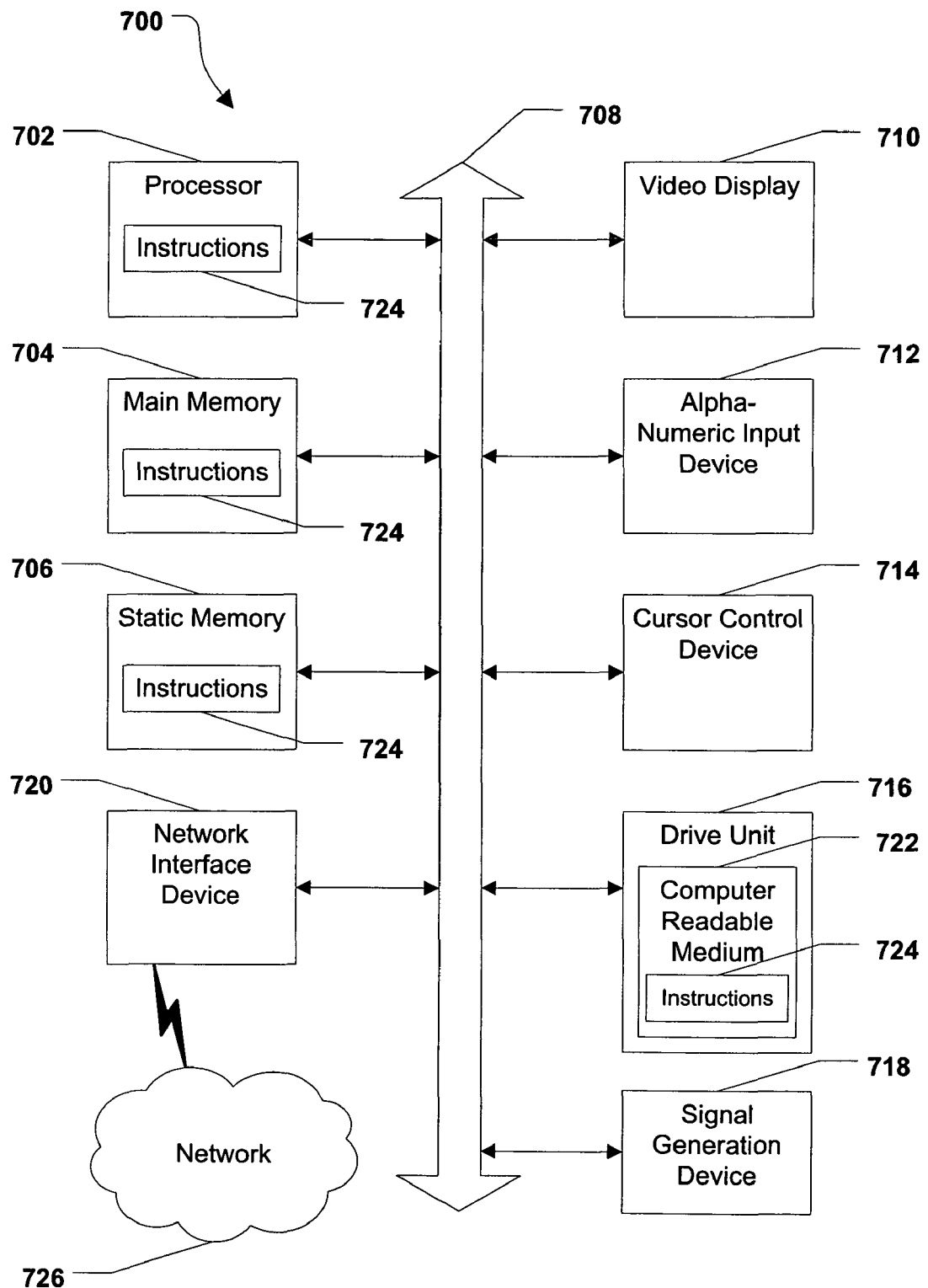
FIG. 7 is a diagram of an embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices, or may be embedded within a network aggregate device, such as those described with reference to FIG. 1.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure described herein, the system and method disclosed manage data flow in a network efficiently by dropping packets through the use of several methods. The selection of which method to use could be administrator provisionable or determined automatically by the network based on examining the history of the packet flow. The system and method target points of congestion that typically cause the most problems for services using a network. The result is that more aggressive data flows are forced to back off and smaller flows continue through without disruption. Congestion is reduced and overall bandwidth utilization and network performance is higher. By utilizing the system and method disclosed, the provider can delay the purchase of additional bandwidth which equates to cost savings on network equipment, real estate, HVAC, and common resources.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing data flow in a network, the method comprising:
   receiving a plurality of data flows, wherein each of the plurality of data flows includes a corresponding plurality of data packets;
   in response to a determination that a queue that includes the plurality of data flows is congested:
      when a first data flow of the plurality of data flows is associated with a transmission control protocol (TCP), dropping at least a first data packet from the first data flow when the at least first data packet satisfies a first criterion associated with a TCP window size of the at least first data packet; and
      in response to a determination of ongoing congestion at the queue after dropping at least the first data packet from the first data flow, when a second data flow of the plurality of data flows is associated with a hypertext transfer protocol (HTTP), dropping a second data packet from the second data flow when the second data packet has a selected file type associated with HTTP.

2. The method of claim 1, further comprising determining whether the queue is congested by determining whether a data stream in the queue exceeds a predetermined proportion of a capacity of the queue, wherein the data stream includes the plurality of data flows.

3. The method of claim 1, further comprising separating the plurality of data packets into the plurality of data flows based on a source Internet Protocol (IP) address and a destination IP address associated with each of the plurality of data packets.

4. The method of claim 1, wherein the first criterion specifies that the TCP window size of the at least first data packet is greater than a threshold window size.

5. The method of claim 1, wherein the first criterion specifies that the TCP window size of the at least first data packet is less than a threshold window size.

6. The method of claim 1, further comprising:
   determining whether any of the plurality of data packets within the plurality of data flows includes an acknowledgement (ACK) bit; and
   dropping at least one data packet that does not include the ACK bit.

7. The method of claim 6, further comprising dropping at least one data packet having the ACK bit when each of the plurality of data packets includes the ACK bit.

8. The method of claim 2, further comprising determining whether the data stream in the queue exceeds the proportion of the capacity of the queue after dropping the at least first data packet.

9. The method of claim 1, wherein the selected file type is one of a text file, a graphics file, an image file, a sound file, a video file, and a multimedia file.

10. A system to manage data flow in a network, the system comprising:
    a processor;
    a memory device accessible to the processor; and
    a computer program embedded in the memory device and executable by the processor, wherein the computer program comprises instructions to:
       receive a plurality of data flows, wherein each of the plurality of data flows includes a corresponding plurality of data packets;
       in response to an indication that a queue that includes the plurality of data flows is congested, when a first data flow of the plurality of data flows is associated with a transmission control protocol (TCP), drop at least a first data packet from first data flow when the at least first data packet satisfies a first criterion associated with a TCP window size of the at least first data packet; and
       in response to a determination of ongoing congestion at the queue after dropping the at least first data packet from the first data flow, when a second data flow of the plurality of data flows is associated with a hypertext transfer protocol (HTTP), drop a second data packet from the second data flow when the second data packet has a selected file type associated with HTTP.

11. The system of claim 10, wherein the computer program further comprises instructions to determine whether the queue is congested by determining whether a data stream in the queue exceeds a predetermined proportion of a capacity of the queue, wherein the data stream includes the plurality of data flows.

12. The system of claim 10, wherein the computer program further comprises instructions to separate the plurality of data packets into the plurality of data flows based on a source internet protocol (IP) address and a destination IP address associated with each of the plurality of data packets.

13. The system of claim 10, wherein the first criterion specifies that the TCP window size of the at least first data packet is greater than a threshold window size.

14. The system of claim 10, wherein the first criterion specifies that the TCP window size of the at least first data packet is less than a threshold window size.

15. The system of claim 10, wherein the computer program further comprises instructions to determine whether any data packets included in the plurality of data flows includes an acknowledgement (ACK) bit.

16. The system of claim 15, wherein the computer program further comprises instructions to drop at least one data packet in the plurality of data flows when the at least one data packet includes the ACK bit.

17. The system of claim 11, wherein the computer program further comprises instructions to determine whether the data stream in the queue exceeds the capacity of the queue after dropping the at least first data packet.

18. The system of claim 10, the selected file type is one of a text file, a graphics file, an image file, a sound file, a video file, and a multimedia file.

19. A non-transitory computer-readable medium having an encoded computer program comprising processor-executable instructions that, when executed by a processor, cause the processor to:
 receive a plurality of data flows, wherein each of the plurality of data flows includes a plurality of data packets;
 in response to a determination that a queue that includes the plurality of data flows is congested, when a first data flow of the plurality of data flows is associated with a transmission control protocol (TCP):
  drop at least one a first data packet from at least a first data packet from the first data flow when the at least first data packet satisfies a first criterion associated a TCP window size of the at least first data packet; and
  in response to a determination of ongoing congestion at the queue after dropping at least the first data packet from the first data flow, when a second data flow of the plurality of data flows is associated with a hypertext transfer protocol (HTTP), drop a second data packet from the second data flow when the second data packet has a selected file type associated with HTTP.

20. The method of claim 1, wherein when the first data flow is associated with a different protocol that differs from the TCP, in response to the determination that the queue is congested, dropping a particular data packet from the first data flow when the particular data packet satisfies a different criterion that is associated with the different protocol.

21. The method of claim 1, further comprising, in response to the determination that the queue is congested:
 when the first data flow is associated with a file transfer protocol (FTP), dropping at least the first data packet from the first data flow when the at least first data packet satisfies a third criterion associated with a file size; and
 when the first data flow is associated with a user datagram protocol (UDP), dropping at least the first data packet from the first data flow when the at least first data packet satisfies a fourth criterion associated with a datagram size.

22. The system of claim 10, wherein the computer program includes instructions to, when the first data flow is associated with a different protocol that differs from the TCP, drop a particular data packet from the first data flow when the particular data packet meets a different criterion that is associated with the different protocol.

23. The system of claim 10, wherein the computer program further comprises instructions to:
 in response to the determination that the queue is congested:
  when the first data flow is associated with a file transfer protocol (FTP), drop at least the first data packet from the first data flow when the at least first data packet satisfies a third criterion associated with a file size; and
  when the first data flow is associated with a user datagram protocol (UDP), drop at least the first data packet from the first data flow when the at least first data packet satisfies a fourth criterion associated with a datagram size.

24. The non-transitory computer readable medium of claim 19, further including instructions to, when the first data flow is associated with a different protocol that differs from the TCP, drop a particular data packet from the first data flow when the particular data packet meets a different criterion that is associated with the different protocol.

25. The non-transitory computer readable medium of claim 19, wherein the selected file type is one of a text file, a graphics file, an image file, a sound file, a video file, and a multimedia file.

26. The non-transitory computer readable medium of claim 19, further comprising instructions to:
 in response to the determination that the queue is congested:
  when the first data flow is associated with a file transfer protocol (FTP), drop at least the first data packet from the first data flow when the at least first data packet satisfies a third criterion associated with a file size; and
  when the first data flow is associated with a user datagram protocol (UDP), drop at least the first data packet from the first data flow when the at least first data packet satisfies a fourth criterion associated with a datagram size.

* * * * *